United States Patent [19]
Wuertz

[11] Patent Number: 5,297,898
[45] Date of Patent: Mar. 29, 1994

[54] APPARATUS FOR EXTRACTING DRIP IRRIGATION TUBING

[76] Inventor: Howard A. Wuertz, 3227 West Bechtel Rd., Coolidge, Ariz. 85228

[21] Appl. No.: 911,720

[22] Filed: Jul. 10, 1992

[51] Int. Cl.⁵ ............................................. F16L 1/032
[52] U.S. Cl. ....................................... 405/154; 171/62
[58] Field of Search .................... 405/36, 38, 43, 154, 405/174, 181, 182; 171/50, 62

[56] References Cited

U.S. PATENT DOCUMENTS

| | | | |
|---|---|---|---|
| 4,373,833 | 2/1983 | Watanabe | 405/36 |
| 4,461,598 | 7/1984 | Flechs | 405/36 X |
| 4,637,755 | 1/1987 | Tollefson et al. | 405/36 X |
| 4,744,696 | 5/1988 | Vidler | 405/174 X |

Primary Examiner—Randolph A. Reese
Assistant Examiner—Christopher J. Novosad
Attorney, Agent, or Firm—Tod R. Nissle

[57] ABSTRACT

Apparatus for extracting conduit buried in the ground includes a frame, rippers carried on the frame, and a take-up assembly mounted on the frame to draw the conduit from the ground while the apparatus is moving in a selected direction of travel. The rippers loosen the soil adjacent the conduit to enable the conduit to be easily pulled free from the ground. The take-up assembly includes a take-up roll and a plate adjacent one end of the take-up roll. The plates prevents conduit which is wound around the take-up roll from sliding off of the roll.

3 Claims, 3 Drawing Sheets

APPARATUS FOR EXTRACTING DRIP IRRIGATION TUBING

This apparatus relates to apparatus for extracting conduit buried in the ground.

More particularly, the invention relates to apparatus for extracting conduit from a plowed field, the field including alternating generally parallel furrows and elongate upstanding beds of earth, each elongate bed generally lying along and following a horizontally oriented imaginary line passing through the center of the bed.

In another respect, the invention relates to conduit extraction apparatus of -the type described which extracts a length of conduit which is buried in a bed and lies along a line generally parallel to the horizontal imaginary centerline passing through the bed.

In still a further respect, the invention pertains to conduit extraction apparatus for winding about a rotating spindle a length of conduit which is extracted from the ground such that the conduit wound about the spindle can be readily removed from the spindle.

In yet another respect, the invention relates to conduit extraction apparatus which winds about a rotating spindle a length of conduit extracted from the ground and which permits the rate of rotation of the spindle to be adjusted while the conduit extraction apparatus is in the process of removing conduit from a plowed field.

In yet still another respect, the invention relates to conduit extraction apparatus which can be readily attached to and removed from a conventional tool carrying rig, the tool carrying rig including a plurality of ground engaging wheels and means for securing the rig to the rear of a tractor to be pulled over a plowed field.

Equipment for burying conduit is well known in the art. See, for example, U.S. Pat. Nos. 4,637,755 to Tollefson et al., 2,118,553 to Garlinger, 2,722,181 to Hash, 3,313,115 to Kniefel, 3,391,545 to Linneman, 3,668,879 to Ogle, and 3,849,999 to Coffey.

When the conduit buried consists of drip irrigation tubing, the perforations in the tubing tend, over time, to become clogged, requiring that the tubing be removed and replaced with new tubing.

The extraction from the ground of buried drip irrigation tubing can be difficult for several reasons. First, the tubing tends to stretch and, if pulled too tightly, to break. Second, the ground is sometimes hard, making extraction of the tubing difficult. Third, storing long lengths of extracted drip irrigation tubing is awkward. Winding extracted drip irrigation tubing onto a rotating cylinder or spindle can be difficult because the speed at which the tubing is removed from the ground varies depending on variations in the speed of the tractor which is pulling the cylinder, the amount by which the tube stretches, the hardness and other physical properties of the ground in which the tubing is buried, etc. Tubing being wound onto a rotating cylinder sometimes also tends to "jump" the ends of the cylinder and become wrapped around the axle on which the cylinder is mounted. Fourth, discarding drip irrigation tubing after it is removed is a problem. Winding the tube onto a rotating cylinder while the tubing is pulled from the ground appears to be a reasonable way of storing extracted tubing. However, removal of the spool of tubing from the cylinder is usually only accomplished by removing the cylinder from the equipment on which it is carried and by pulling the spool of tubing off of one end of the cylinder.

Accordingly, it would be highly desirable to provide apparatus which could, while moving over the ground, remove buried conduit from the ground, wind the remove conduit into a spool, and permit the spooled conduit to be readily removed from the apparatus and discarded.

Therefore, it is a principal object of the invention to provide improved apparatus from extracting buried conduit from the ground.

Another object of the instant invention is to provide improved apparatus for extracting strands of conduit from a plowed field, the plowed field including alternating furrows and upstanding, generally parallel elongate beds, each strand of conduit being buried in one of said beds.

A further object of the invention is to provide improved conduit extraction apparatus which, while extracting a strand of conduit from one of the beds in a plowed field, accurately tracks the furrows in the field and loosens the dirt in the bed to facilitate removal of the conduit from the bed without breakage of the conduit.

Still another object of the invention is to provide improved conduit extraction apparatus which efficiently rolls the extracted conduit into a spool regardless of the speed at which the apparatus moves over a field and regardless of the amount by which the conduit may stretch while being extracted from the ground.

Yet a further object of the invention is to provide improved conduit extraction apparatus which enables a spool of extracted conduit carried on the apparatus to be readily removed from the apparatus.

These and other, further and more specific objects and advantages of the invention will be apparent to those skilled in the art from the follow detailed description thereof, taken in conjunction with the drawings, in which.

Figure 1:
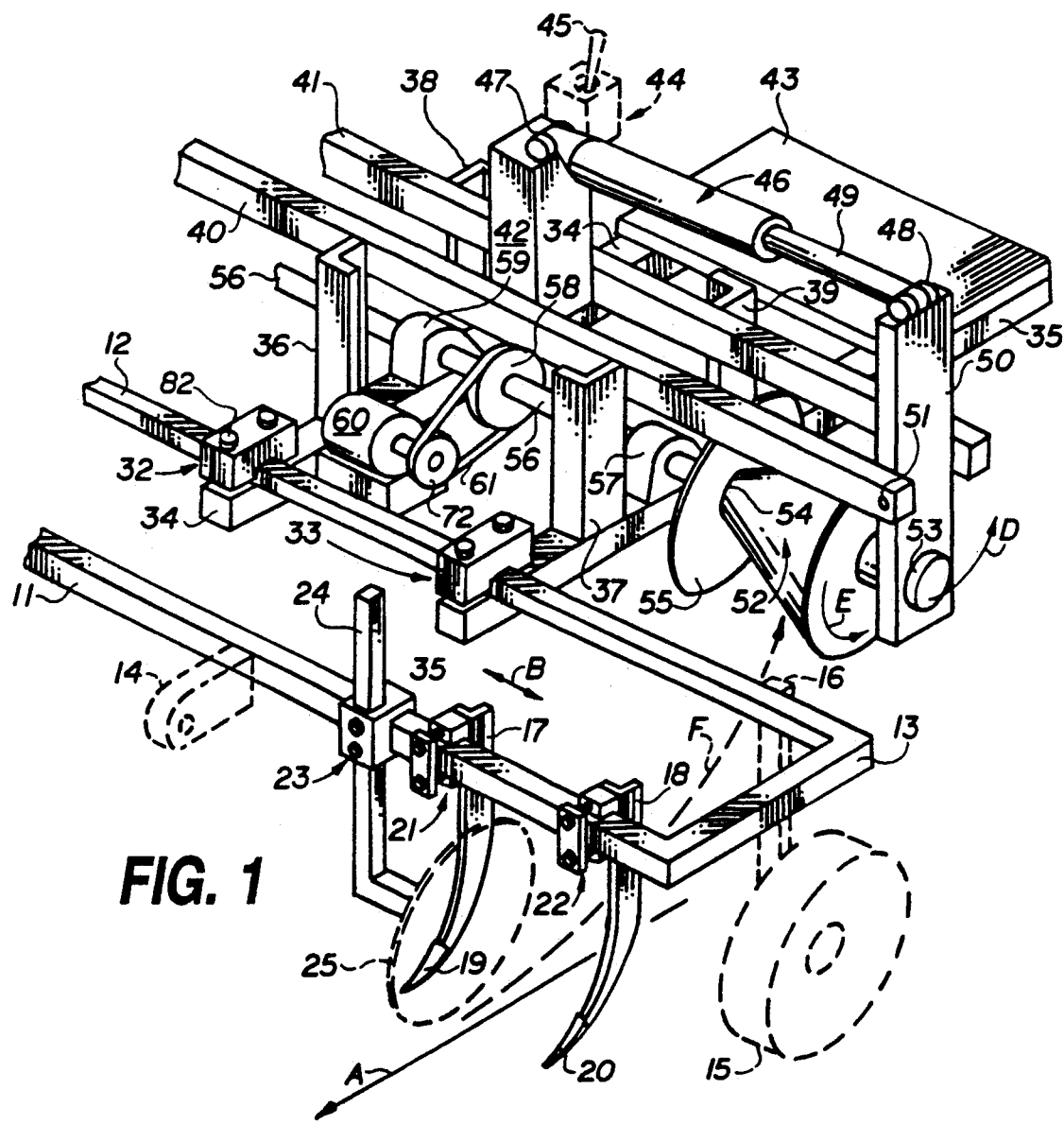
FIG. 1 is a perspective view of a portion of apparatus constructed in accordance with the principles of the invention and constituting the presently preferred embodiment and best mode thereof.

Briefly, in accordance with my invention, I provide apparatus for extracting an elongate strip of tubing from the ground. The apparatus includes a frame; at least one elongate member carried on said frame and having a distal end carrying a tooth for breaking up the ground along a line of travel generally spaced apart from and parallel to said elongate strip of tubing in a direction of travel generally parallel to said elongate strip of tubing;

and, an assembly mounted on the frame to draw the strip of tubing from the ground while the apparatus moves in the direction of travel. The assembly includes a take-up roll having a distal end and rotating about a selected axis. The assembly also includes a plate adjacent the distal end, perpendicular to the axis, and extending outwardly from the distal end and the axis to prevent tubing wound on the take-up roll from sliding off of the distal end in a direction parallel to the axis.

In another embodiment of the invention, I provide apparatus for extracting an elongate strip of tubing from the ground. The apparatus includes a frame and an assembly carried on the frame to draw the strip of tubing from the ground while the apparatus moves in a direction of travel generally parallel to the strip of tubing. The assembly includes a take-up roll having a distal end and rotating about a selected axis. The assembly also includes a plate adjacent the distal end, generally perpendicular to said axis, and extending outwardly f rom the distal end and the axis to prevent tubing wound around the take-up roll from sliding off of the distal end in a direction parallel to the axis. The assembly also includes means for displacing the take-up roll away from the plate to an orientation in which tubing wound on the take-up roll slides off of the roll under the force of gravity.

In still another embodiment of the invention, I provide apparatus for extracting an elongate strip of tubing from the ground. The apparatus includes a frame; an assembly carried on the frame to draw the strip of tubing from the ground while the apparatus moves in a direction of travel generally parallel to the strip of tubing, the assembly including a take-up roll having a distal end and rotating about a selected axis, and, a plate adjacent the distal end, generally perpendicular to the axis, and extending outwardly from the distal end and the axis to prevent tubing wound on the take-up roll from sliding off of the distal end in a direction parallel to the axis; motive power means mounted on the frame for rotating the take-up roller; control means mounted on the frame and operatively associated with the motive power means for adjusting the speed of rotation of the take-up roller while the apparatus moves in the direction of travel; and, a platform attached to the frame such that an individual can operate the control means while standing on the platform.

In yet another embodiment of the invention, I provide apparatus for extracting an elongate strip of tubing from the ground. The apparatus includes a primary frame including a plurality of ground engaging wheels; at least one elongate member carried on the primary frame and having a distal end carrying a tooth for breaking up the ground along a line of travel generally spaced apart from and parallel to the elongate strip of tubing in a direction of travel generally parallel to the elongate strip of tubing; and, a secondary frame removably attached to the primary frame and including an assembly to draw the strip of tubing from the ground while the apparatus moves in the direction of travel. The assembly includes a take-up roll having a distal end and rotating about a selected axis, and includes a plate adjacent the distal end. The plate is perpendicular to the axis and extends outwardly from the distal end and the axis to prevent tubing wound on the take-up roll from sliding off of the distal end in a direction parallel to the axis. The apparatus can also include a disk mounted on the primary frame such that the disk breaks up the ground along a line generally parallel to and intermediate the strip of tubing and the line of travel of the elongate member.

Turning now to the drawings, which depict the presently preferred embodiment of the invention for the purpose of illustrating the practice thereof and not by way of limitation of the scope of the invention, and in which like reference characters indicate corresponding elements throughout the several views, FIG. 1 illustrates conduit extraction apparatus constructed in accordance with the invention and including a rigid frame for carrying rippers 17 and 18, disks 25 and other tools. The frame includes elongate members 11, 12, and 13. A yoke or hitch 14 or other means is mounted on the frame for securing the frame to the rear of a tractor or other vehicle for pulling the apparatus in the direction of arrow T. A plurality of ground engaging wheels 15 are rotatably mounted on arms 16. Each arm 16 is secured to the frame. The wheels 15 maintain the frame members 11, 12, 13 in a position generally parallel to and above the ground while the apparatus moves over the ground in the direction of arrow A.

Disk 25 is mounted for free wheeling rotation on L-shaped arm 24. Arm 24 extends through and is removably secured in bracket 23 by bolts which extend through the wall of bracket 23 and against arm 24. Bracket 23 is slidably carried on member 11 for movement therealong in the directions indicated by arrows B. Bolts on the rear of bracket 23 extend through the wall of the bracket and against member 11 and are used to secured bracket 23 in a selected position along member 11.

Ripper 17 includes a tapered blade 19 attached to its lower end. The upper end of ripper 17 is removably attached to bracket assembly 21. The bolts securing bracket assembly 21 to member 11 can be loosened such that assembly 21 can be slid along member 11 in the directions indicated by arrows B.

A tapered blade 20 is attached to the lower end of ripper 18. The upper end of ripper 18 is removably attached to bracket assembly 22. The bolts securing bracket assembly 22 to member 11 can be loosened such that assembly 22 can be slid along member 11 in the directions indicated by arrows B.

Figure 3:
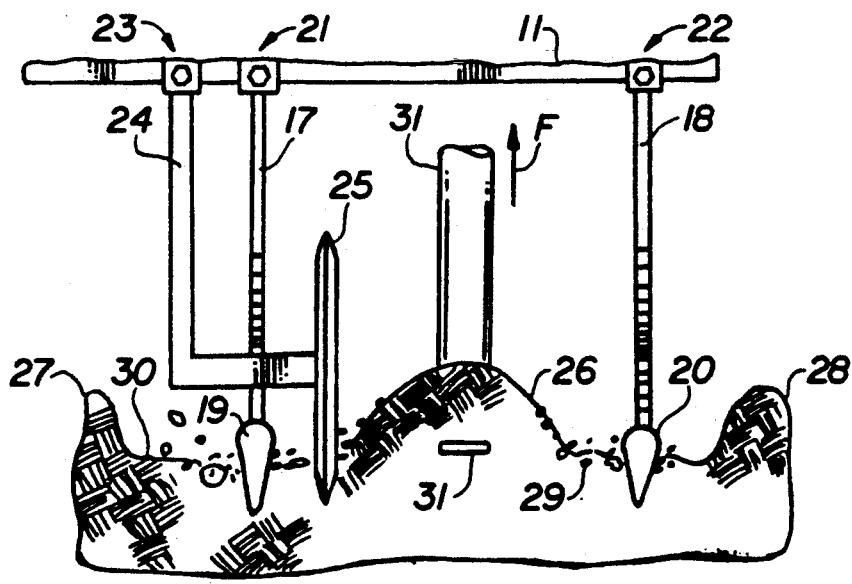
FIG. 3 is a schematic cross sectional view illustrating the mode of operation of the invention in a plowed field having alternating parallel furrows and beds, the section line being made perpendicular to the longitudinal axes of the beds and furrows of the field such that the longitudinal axes of the beds in FIG. 3 are generally perpendicular to the plane of the paper.

As illustrated in FIG. 3, rippers 17 and 18 are mounted on member 11 such that when the apparatus of FIG. 1 is pulled through a plowed field having alternating generally parallel furrows 29, 30 and elongate upstanding beds of earth 26 to 28, the blades 19 and 20 of rippers 17 and 18 bracket a bed 26 and break up the ground to either side of a strip of drip irrigation tubing 31 or other conduit buried in the bed 26. The blades 19 and 20 of ripper 17 and 18 move in a direction of travel generally parallel to arrow A, to bed 26 and to the elongate strip of drip irrigation tubing 31 buried in the bed.

Disk 25 is positioned intermediate one of blades 19, 20 and tubing 31 and is particularly useful when the ground comprising the furrows and beds is hard. Disk 25 moves in a direction of travel generally parallel to arrow A, to bed 26 and to the elongate strip of drip irrigation tubing 31 buried in the bed.

A secondary frame is removably attached to member 12 with bracket assemblies 32, 33. Each bracket assembly 32, 33 includes bolts 82 which extend through the bracket assembly into one of elongate substantially rigid members 34 and 35 of the secondary frame. The secondary frame also includes L-shaped members 36, 37, 38 and 39. The lower ends of members 36 and 38 are welded or otherwise secured to member 34. The lower ends of members 37 and 39 are welded or otherwise secured to member 35. Elongate member 40 is welded or otherwise secured to the upper ends of members 36 and 37. Elongate member 41 is welded or otherwise secured to the upper ends of members 38 and 39. Neck member 42 is welded or otherwise secured intermediate members 40 and 41. Elongate member 50 is pivotally secured intermediate members 40 and 41 by a pin 51 which extends through the ends of members 40, 41 and through member 50. One end of hydraulic piston 46 is pivotally secured to the upper end of member 42 by hinge 47. The other end of piston 46 is pivotally secured to the upper end of member 50 by hinge 48. In operation of piston, cylindrical arm 49 is, in conventional fashion, drawn into and pressed out of the cylindrical housing of piston 46. The hydraulic lines and pump supplying hydraulic fluid to piston 46 are omitted from FIG. 1 for the sake of clarity. Compressed air or any other means can be utilized to operate a piston 46.

Tapered take-up roll or spindle 52 is attached to an axle assembly 53 which is journalled for rotation in the lower end of member 50. The distal end 54 of take-up roll 52 is normally positioned adjacent plate 55 during operation of the apparatus of FIG. 1. Circular plate 55 is attached to shaft 56. Shaft 56 is journalled for rotation in sleeves 57 and 59. Pulley or gear 58 is fixedly attached to shaft 56. Pulley 72 is rotated by motor 60 to displace endless belt 61 and cause pulley 58, shaft 56, and plate 55 to rotate. Belt 61 can be replaced with a chain and pulleys 58 and 72 can be replaced with toothed sprockets which carry the chain.

Figure 2:
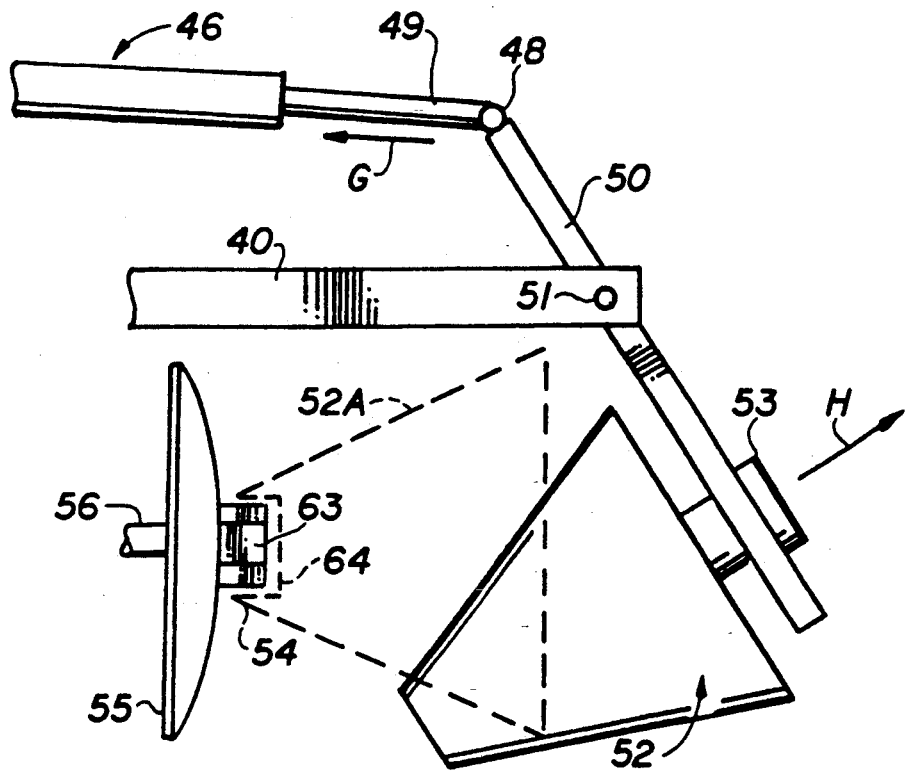
FIG. 2 is a side elevation view of a portion of the apparatus of FIG. 1 illustrating further construction details thereof and the mode of operation for removing a spool of extracted irrigation tubing from the apparatus.
Figure 4:
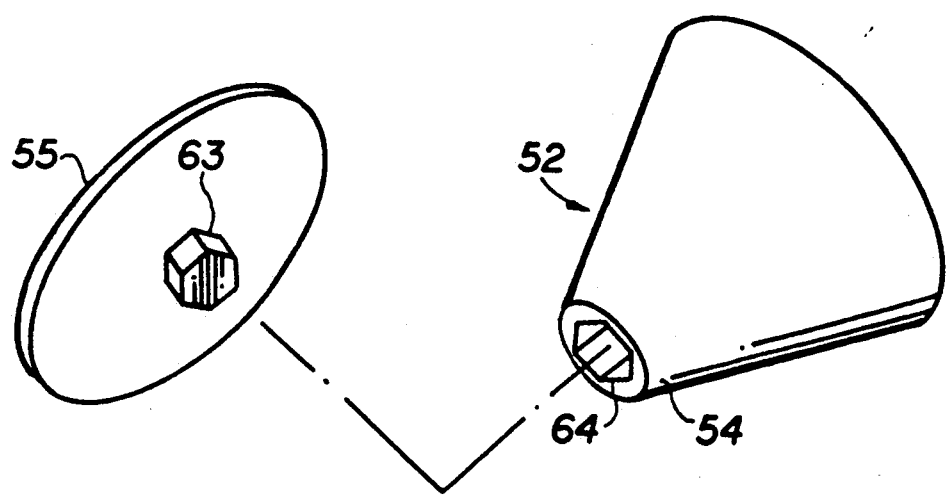
FIG. 4 is a perspective view illustrating the interlocking of the tapered windup roll and plate in the apparatus of FIG. 1; and, FIG. 5 is a perspective view of an alternate spindle construction.

As shown in FIGS. 2 and 4, hex member 63 is fixedly attached to the center of plate 55. Opening 64 in the end 54 of take-up roll or spindle 52 is shaped to slidably receive member 63 so that when plate 55 and roll 52 are in the operative positions illustrated in FIG. 1, the rotation of plate 55 in the direction of arrow E causes roll 52 also to turn in the direction of arrow E. Member 63 engages opening 64 and imparts motive power to roll 52. Motor 60 can be powered with hydraulic fluid, with electricity, or with any other desirable energy source.

Figure 5:
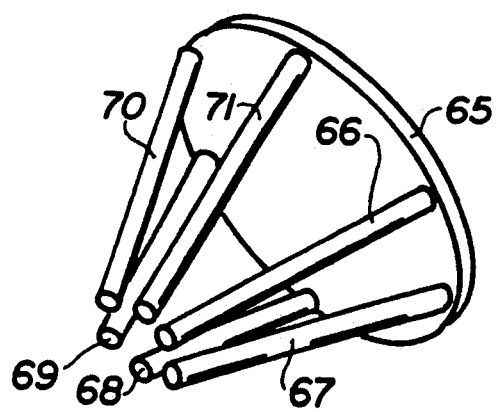

Tapered roll 52 can be replaced by the tapered take-up roll illustrated in FIG. 5. The roll in FIG. 5 includes a circular plate 65 and a plurality of spaced apart fingers 66 to 71 attached to and extending outwardly from a circular face of plate 65. Fingers 66 to 71 taper to a point spaced away from plate 65.

Plate 55 is important in the practice of the invention because it promotes the winding of conduit 31 about roll 52 and prevents the wound conduit 31 from "jumping" off of roll 52 and winding around shaft 56. Various methods for securing the conduit 31 to the take-up roll 52 are well-known in the art, and do not contribute to the patentability of the present invention. Plate 55 extends outwardly from end 54 and from the longitudinal axis of shaft 56.

A control box 44 is mounted on the secondary frame for controlling motor 60 and the speed of rotation of plate 55 and roll 52. The lever 45 or other comparable control means of control box 44 is operated by an individual standing on platform 43. When control box is utilized in connection with a hydraulic fluid system, there preferably are two controls. One control adjusts the pressure at which a pump pumps hydraulic fluid into motor 60 to operate motor 60 and turn pulley 62. The other control bleeds off some of the fluid being pumped from the pump into motor 60 to reduce or increase the pressure applied to motor 60. There is also a third control which operates piston 46. Each of the foregoing controls is positioned on the secondary frame or on the apparatus such that an individual standing on platform 43 can reach and operate the controls while the apparatus is moving over a field in the direction of travel indicated by arrow A.

In use, hitch 14 is utilized to connect the apparatus of FIG. 1 to a tractor. The tractor pulls the apparatus over a field in the direction of arrow A. When the apparatus is pulled over a field having alternating beds 26 to 28 and furrows 29 and 30, the blades 19 and 20 of rippers 17 and 18 bracket a bed 26. Disk 25, if used, is positioned intermediate a blade 19 and 29 and conduit 31. The blades 19 and 20 and the disk 25 loosen the soil comprising the bed 26 and permit the drip irrigation tubing or other conduit 31 to be pulled from the ground in the manner indicated by arrows F in FIGS. 1 and 3. As the tubing is pulled from the ground, it is wound around rotating spindle or roll 52. As earlier described, motor 60, shaft 56, and plate 55 cause roll 52 to rotate in the direction of arrow E. After roll 52 is fully wound with a strip of conduit, the apparatus is moved to a desirable location, typically one end of the field being worked, and the controls are utilized to activate piston 46 such that cylindrical arm 49 is retracted in the direction of arrow G in FIG. 2. When arm 49 is retracted, member 50 pivots about pin 51 in the direction of arrow H and roll 52 moves from its normal operative position 52A to the position illustrated in FIG. 2. In the position of roll 52 illustrated in FIG. 2, conduit wound on roll 52 normally will slide off of roll 52 under the force of gravity and fall to the ground. If tubing or conduit is tightly wound on roll 52, the tubing may require before the tubing slides off of the tapered outer conical surface of roll 52 and onto the ground. After the tubing has slid off of roll 52, piston 46 is actuated to extend piston 49 in a direction opposite that of arrow G, pivot member 50 about pin in a direction opposite that indicated by arrow H, and return roll 52 to its normal operative position 52A shown in FIG. 1. As would be appreciated by those of skill in the art, the apparatus of the invention, while primarily intended for use on fields having alternating rows of beds and furrows, can be utilized to extract tubing from relatively flat ground. In any event, the distance between blades 19 and 20 and the distance of disk 25 from conduit 31 is adjusted so that the ground in which conduit 31 is buried is loosened sufficiently to permit the conduit 31 to be pulled free from the ground and wound on roll 52. When drip irrigation tubing is being removed from beds in a plowed field including alternating rows of beds and furrows, the tubing ordinarily is located in a bed at a height or elevation above the bottoms of the furrows bracketing the bed.

The apparatus of FIG. 1 can be constructed to include two or more spindle 52—plate 55 units and accompanying rippers 17, 18 and disk 25 such that the apparatus can simultaneously extract tubing or conduit from two or more beds in a field. For example, another plate 55 can be attached to the left hand most end of shaft 56 and a second spindle 52, member 50, and piston 46 mounted on members 40, 41, 42 of the second frame to be operatively associated with the second plate 55. Similarly, a second pair of rippers 17, 18 and a second disk 25 can be attached to the left hand end of member 11 to be operatively associated with the second plate 55 and spindle 52.

Having described my invention in such terms as to enable those skilled in the art to understand and practice it and having identified the presently preferred embodiments thereof, I claim:

1. Apparatus for extracting an elongate strip of tubing from a bed in a field, said bed being bounded on either side by a furrow, said apparatus comprising
    (a) a frame;
    (b) at least one elongate member carried on said frame and having a distal end carrying a tooth for breaking up the ground in the bed and at the surface of one of the furrows along a line of travel generally spaced apart from and parallel to said elongate strip of tubing in a direction of travel generally parallel to said elongate strip of tubing;
    (c) a disk intermediate and spaced apart from said elongate member and said tubing for breaking up the ground in the bed in a direction of travel generally parallel to said elongate strip of tubing;
    (d) an assembly mounted on said frame to draw said strip of tubing from the ground while said apparatus moves in said direction of travel, said assembly including
        (i) a take-up roll having a distal end and rotating about a selected axis, and
        (ii) a plate adjacent said distal end, perpendicular to said axis, and extending outwardly from said distal end and said axis to prevent tubing wound on said take-up roll from sliding off of said distal end in a direction parallel to said axis.

2. Apparatus for extracting an elongate strip of tubing from the ground, said apparatus comprising
    (a) a frame;
    (b) an assembly carried on said frame to draw said strip of tubing from the ground while said apparatus moves in a direction of travel generally parallel to said strip of tubing, said assembly including
        (i) a conical take-up roll (52) having a proximate end and a distal end (54) and rotating about a selected axis, said take-up roll tapering from said proximate end to said distal end (54),
        (ii) a plate (55) adjacent said distal end, generally perpendicular to said axis, and defining a concave surface extending outwardly from said distal end and said axis and having a central portion adjacent said distal end and an outer peripheral portion connected to and extending outwardly from said central portion, and in a direction parallel to said axis away from said distal end,
        said plate preventing tubing wound around said conical take-up roll from sliding off of said distal end and over said plate (55) in a direction parallel to said axis, and
        (iii) means for displacing said take-up roll away from said plate to an orientation in which tubing wound on said take-up roll slides off of said roll under the force of gravity.

3. Apparatus for extracting an elongate strip of tubing from a bed in a field, said bed being bounded on either side by a furrow, said apparatus comprising
    (a) a frame;
    (b) at least one elongate member carried on said frame and having a distal end carrying a tooth for breaking up the ground in the bed and at the surface of one of the furrows along a line of travel generally spaced apart from and parallel to said elongate strip of tubing in a direction of travel generally parallel to said elongate strip of tubing;
    (c) a disk intermediate and spaced apart from said elongate member and said tubing for breaking up the ground in the bed in a direction of travel generally parallel to said elongate strip of tubing;
    (d) an assembly mounted on said frame to draw said strip of tubing from the ground while said apparatus moves in said direction of travel, said assembly including
        (i) a conical take-up roll (52) having a proximate end and a distal end (54) and rotating about a selected axis, said take-up roll tapering from said proximate end to said distal end (54),
        (ii) a plate adjacent said distal end, generally perpendicular to said axis, and defining a concave surface extending outwardly from said distal end and said axis and having a central portion adjacent said distal end and an outer peripheral portion connected to and extending outwardly from said central portion, and in a direction parallel to said axis away from said distal end,
        said plate preventing tubing wound around said conical take-up roll from sliding off of said distal end and over said plate in a direction parallel to said axis, and
        (iii) means for displacing said take-up roll away from said plate to an orientation in which tubing wound on said take-up roll slides off of said roll under the force of gravity.

* * * * *